United States Patent [19]

Yamamoto

[11] Patent Number: 4,907,291
[45] Date of Patent: Mar. 6, 1990

[54] TRANSMITTER/RECEIVER APPARATUS

[75] Inventor: Osamu Yamamoto, Tokyo, Japan

[73] Assignee: NEC Corporation, Japan

[21] Appl. No.: 52,001

[22] Filed: May 19, 1987

[30] Foreign Application Priority Data

May 23, 1986 [JP] Japan .............................. 61-118908

[51] Int. Cl.$^4$ .......................... H04B 1/44; H04B 1/50
[52] U.S. Cl. ....................................... 455/78; 455/86; 455/87; 455/19
[58] Field of Search .................... 455/20, 21, 22, 76, 455/78, 86, 87, 82, 83, 90, 129, 19, 73, 81, 151; 342/78; 370/24, 26, 30, 32

[56] References Cited

U.S. PATENT DOCUMENTS

| | | | |
|---|---|---|---|
| 2,864,944 | 5/1954 | Peter | 455/16 |
| 3,624,508 | 9/1969 | Kach | 370/30 |
| 4,186,344 | 1/1980 | Higuchi et al. | 455/86 |
| 4,592,093 | 5/1986 | Ouchi et al. | 455/4 |

*Primary Examiner*—Robert L. Griffin
*Assistant Examiner*—Ralph Smith
*Attorney, Agent, or Firm*—Laff, Whitesel, Conte & Saret

[57] ABSTRACT

A miniature microwave transmitter/receiver is small enough to be mounted in the feeder of a microwave antenna. The transmitter and receiver do not interfere with each other despite their close proximity resulting from their small size. The non-interfering results are achieved by frequency separating the bands used for transmission, reception, and the intermediate transmit and receive frequencies. Since none of these frequencies overlap, they do not interfere with each other, even if there is an insufficient isolation between systems.

12 Claims, 2 Drawing Sheets

TRANSMITTER/RECEIVER APPARATUS

BACKGROUND OF THE INVENTION

The present invention relates to a transmitter/receiver apparatus having an application to microwave band communications such as satellite communication, and more particularly, to a miniature transmitter/receiver apparatus which is small enough to be installed in, for example, the feeder section of an antenna.

While the tendency to apply satellite communication channels to commercial communications is increasing, a prerequisite for facilitating such an application is reducing the cost and size of a transmitter/receiver apparatus. For example, a miniature transmitter/receiver apparatus which can be incorporated in the feeder section of an antenna, which is about 2 meters in diameter, is desired.

A transmitter/receiver apparatus which is applicable to commercial communications uses a microwave band, e.g., satellite communication. The transmit level is in the order of 1 watt. The receive level is more than 100 dB lower than the transmit level. Hence, it is very important with this type of transmitter/receiver apparatus to set up a sufficient isolation between discrete circuits in order to minimize interference from a transmit system to a receive system. However, for miniaturization and presupposing the overall dimensions of the apparatus housing, the freedom of circuit layout is so limited that a sufficient isolation between independent circuits is impractical.

SUMMARY OF THE INVENTION

It is, therefore, an object of the present invention to provide a miniature and inexpensive transmitter/receiver apparatus which is satisfactorily applicable to microwave band communications, even if the isolation between discrete circuits is insufficient.

In order to achieve the above object, a transmitter/receiver apparatus of the present invention comprises a local oscillator for generating a local oscillation frequency at a predetermined position between a transmit and a receive frequency band. A transmit frequency converter converts a transmit intermediate frequency band into the transmit frequency band based on the local oscillation frequency. The transmit image frequency band of the transmit frequency band does not overlap the receive frequency band. A receive frequency converter converts, based on the local oscillation frequency, the receive frequency band into a receive intermediate frequency band, which does not overlap the transmit intermediate frequency band. Thus, the receive image frequency band of the receiver intermediate frequency band does not overlap the transmit frequency band.

The transmitter/receiver apparatus further comprises a frequency multiplexer which connects to the transmit and receive frequency converters via a single cable, over which a signal of the transmit intermediate frequency band and a signal of the receive intermediate frequency band are propagated in a frequency-multiplexed condition.

The local oscillator generates a local oscillation frequency at a position between a transmit frequency band and a receive frequency band. The oscillation frequency is commonly applied to both transmission and reception. The local oscillation frequency is fed to the transmit and receive frequency converters.

The transmit frequency converter converts a transmit intermediate frequency band into the transmit frequency band based on the local oscillation frequency. The transmit image frequency band does not overlap the receive frequency band.

Further, the receive frequency converter converts, based on the local oscillation frequency, the receive frequency band into a receive intermediate frequency band, which does not overlap the transmit intermediate frequency. Thus, the receive image frequency band does not overlap the transmit frequency band.

As a result, the receive intermediate frequency band, the transmit intermediate frequency band, the transmit image frequency band, the receive frequency band, the local oscillation frequency, the receive image frequency band, and the transmit frequency band are distributed on a frequency axis without overlapping each other.

The frequency multiplexer connects via a single signal cable to the transmit and receive frequency converters, multiplexes an incoming signal of the transmit intermediate frequency band and an outgoing signal of the receive intermediate frequency band, and enables these intermediate frequency signals to be interchanged over the single signal cable.

Thus, in the inventive transmitter/receiver apparatus, the receive intermediate frequency band, the transmit intermediate frequency band, the transmit image frequency band, the receive frequency band, the local oscillation frequency, the receive image frequency band, and the transmit frequency band, do not overlap each other. Hence, an interference due to a migration from the transmit system to the receive system and to other systems is eliminated even if the isolation between independent circuits is insufficient. Thus, the transmitter/receiver apparatus is both simple and miniature. The transmit and receive systems share a single local oscillator to reduce the cost of the apparatus, as compared to the cost of a prior art apparatus in which each of the transmit and receive systems is provided with its own exclusive local oscillator. Further, since a single signal cable suffices for the interchange of all intermediate frequency signals, the cable and constructon expenses are noticeably reduced. Hence, the inventive arrangement can be implemented easily and economically. For example, the inventive apparatus is mounted in an outside antenna feeder section and is connected to an indoor main equipment by a single signal cable.

DETAILED DESCRIPTION OF THE PREFERRED EMBODIMENT

Figure 1:
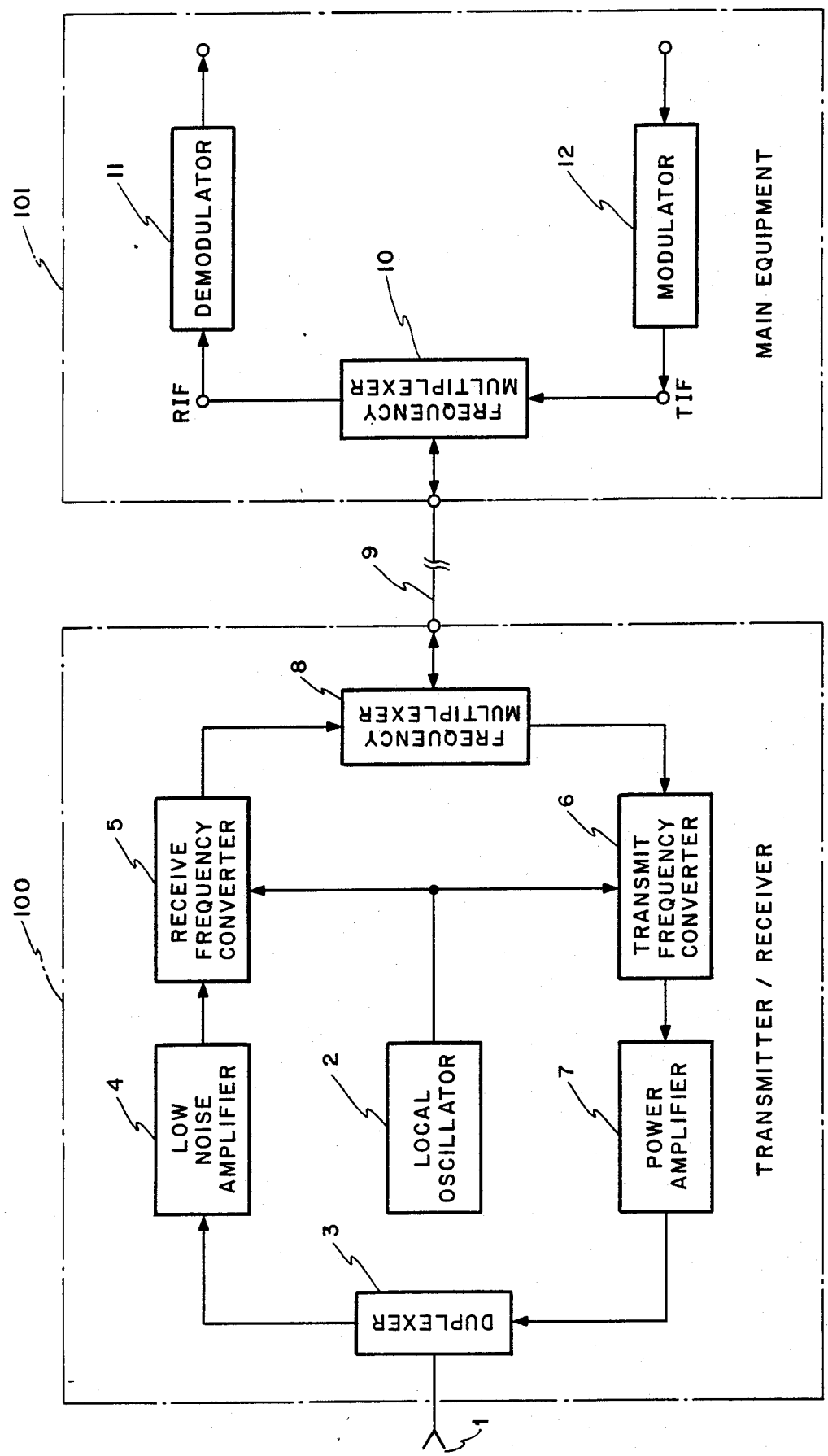
FIG. 1 is a block diagram of a transmitter/receiver apparatus embodying the present invention.

Referring to FIG. 1 of the drawings, a transmitter/receiver apparatus in accordance with the present invention is shown and generally designated by the reference number 100. The apparatus 100 has a miniature box-like configuration and may be mounted in, for example, the feeder section of an outdoor antenna 1. Basically, the apparatus 100 comprises a local oscillator 2, a duplexer 3, a low noise amplifier 4, a receive frequency converter 5, a transmit frequency converter 6, a power amplifier 7, and a frequency multiplexer 8. The frequency multiplexer 8 is connected by a single signal cable, e.g., a coaxial cable 9, to a frequency multiplexer 10 of indoor main equipment 101. Connected to the frequency multiplexer 10 are a demodulator 11 and a modulator 12.

The local oscillator 2 oscillates at a local oscillation frequency LO (FIG. 2) at a predetermined frequency position located between a transmit frequency band T and a receive frequency band R. The local oscillation frequency LO is fed to the transmit and receive frequency converters 6 and 5. More particularly, assuming that the transmit frequency T lies in a range of 14.0 to 14.5 GHz and the receive frequency R in a range of 11.7 to 12.2 GHz by way of example, the local oscillation frequency LO is preselected to be 12.7 GHz.

A signal modulated by the modulator 12 has a frequency which lies in a transmit intermediate frequency band TIF and which is fed to the transmit frequency converter 6 via the frequency multiplexer 10 of the indoor equipment 101, the signal cable 9, and the frequency multiplexer 8. Responsive to the local oscillator frequency LO, the transmit frequency converter 6 converts the input signal having the frequency TIF into a signal which belongs to the transmit frequency band T. The transmit image frequency TIMG does not overlap the receive frequency band R. The signal with the frequency T is amplified by the power amplifier 7 and, then, radiated from the antenna 1 toward a satellite. In this particular embodiment, the transmit intermediate frequency band TIF ranges from 1.3 to 1.8 GHz while the transmit image frequency band TIMG ranges from 10.9 to 11.4 GHz.

A signal coming in through the antenna 1 and lying in the receive frequency band R is routed through the duplexer 3 and low noise amplifier 4 to the receive frequency converter 5. Based on the local oscillation frequency LO, this converter 5 converts the signal of the receive frequency band R into a signal having a frequency which lies in a receive intermediate frequency band RIF, which does not overlap the transmit intermediate frequency band TIF. The receive image frequency band RIMG does not overlap the transmit frequency band T. The output of the receive frequency converter 5 is delivered to the indoor equipment 101 via the frequency multiplexer 8, signal cable 9, and frequency multiplexer 10. In this particular embodiment, the receive intermediate frequency band RIF ranges from 0.5 to 1.0 GHz, and the receive image frequency RIMG ranges from 13.2 to 13.7 GHz.

Figure 2:
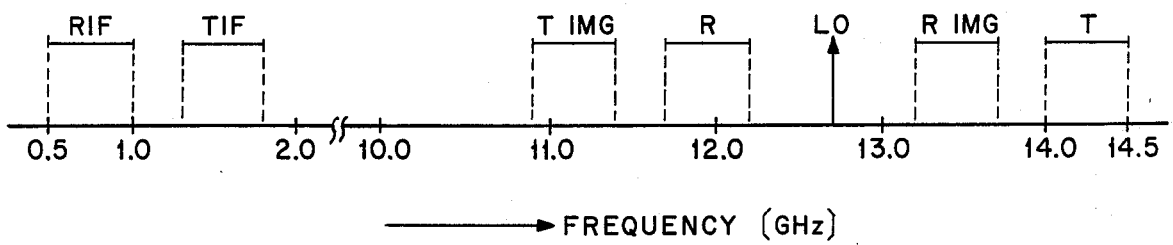
FIG. 2 is a diagram showing a frequency distribution.

FIG. 2 shows the consequent distribution of frequencies which are generated in the transmit and receive systems of the transmitter/receiver apparatus 100. As shown, the receive intermediate frequency band RIF (0.5 to 1.0 GHz), the transmit intermediate frequency band TIF (1.3 to 1.8 GHz), the transmit image frequency band TIMG (10.9 to 11.4 GHz), the receive frequency band R (11.7 to 12.2 GHz), the local oscillation frequency LO (12.7 GHz), the receive image frequency band RIMG (13.2 to 13.7 GHz) and the transmit frequency band T (14.0 to 14.5 GHz) are sequentially arranged on the frequency axis, without overlapping each other.

In short, the present invention implements a transmit and a receive system with a common local oscillation source and, thereby, reduces the cost as compared to a case wherein two independent local oscillation sources are used. Since different intermediate frequency bands are adopted for transmission and reception, an interference from the transmit system to the receive system is eliminated even if the isolation between discrete circuits is incomplete. Such an isolation would occur if a transmit/receive apparatus were installed in a small housing. Furthermore, the transmit image frequency band does not overlap the receive frequency band and the transmit image frequency band also protects the apparatus against interference. Consequently, a simple, miniature and inexpensive transmitter/receiver apparatus is achieved.

Since the transmit and receive intermediate frequencies are different from each other as stated above, intermediate frequency signals can be interchanged between the outdoor apparatus 100 and the indoor main equipment 101 over the single cable 9 by multiplexing signals which belong to those different frequency bands. Each of the frequency multiplexers 8 and 10 has a frequency multiplexing function and a signal interchanging function. This interchanging function allows the single cable 9 to suffice when the apparatus 100 is to be placed outside a building and connected to the indoor equipment 101.

Figure 3:
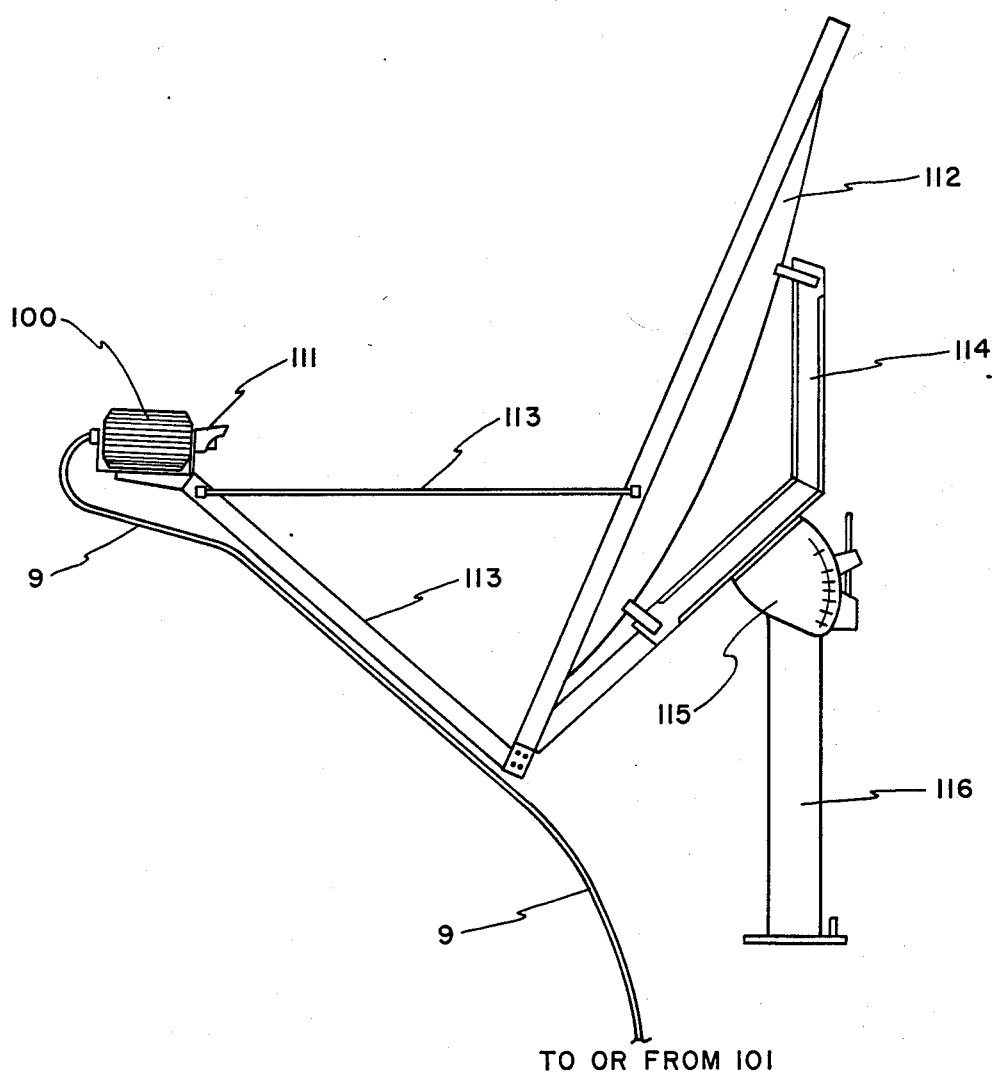
FIG. 3 is a side elevation showing the apparatus of FIG. 1 which is installed in the feeder section of an antenna, by way of example.

As shown in FIG. 3, the transmitter/receiver apparatus 100 is miniature and small enough to be installed even in, for example, the feeder section of an antenna. Therefore, it is easy to mount. Such a small size remarkably reduces the total cost of an antenna and other equipment to which the apparatus 100 is applicable.

FIG. 3 shows the cable, e.g., a coaxial cable 9 adapted to interconnect the outdoor transmitter/receiver apparatus 100 and the indoor equipment 101, a primary radiator, or horn, 111 mounted on the apparatus 100, a parabolic reflector 112 of the antenna, support members 113 for supporting the apparatus 100, a framework 114 for supporting the entire antenna with the apparatus 100, a mechanism 115 for adjusting the elevation of the antenna, and an antenna support post. Basically, the illustrative configuration constitutes an offset parabolic antenna. To align the antenna pointing toward a direction of wave arrival, the azimuth is adjusted by the post 116. The elevation is adjusted by the elevation adjusting mechanism 115.

For an arrangement relating to the present invention, a reference may be made to U.S. patent application (Ser. No. 06/831,667) which is assigned to the assignee of the present invention.

As described above, in a transmitter/receiver apparatus of the present invention, a receive intermediate frequency band, a transmit intermediate frequency band, a transmit image frequency band, a receive frequency band, a local oscillation frequency, a receive image frequency band, and a transmit frequency band have frequency bands which do not overlap each other. Hence, interference from a transmit system to a receive and possibly other systems is eliminated even if the isolation between independent circuits is insufficient, whereby the transmitter/receiver apparatus is rendered simple and miniature.

The transmit and receive systems share a single local oscillator to cut down the cost of the apparatus, as compared to a prior art apparatus in which each system is provided with an exclusive local oscillator. Further, since a single signal cable suffices for the interchange of intermediate frequency signals, the cable and construction expenses are noticeably reduced. Hence, an arrangement can be implemented easily and economically wherein, for example, the apparatus of the present invention is mounted in an outside antenna feeder section and connected to an indoor main equipment by a single signal cable.

What is claimed is:

1. A transmitter/receiver apparatus comprising:

local oscillator means for generating a local oscillation frequency at a predetermined position between a transmit frequency band and a receive frequency band;

transmit frequency convertor means responsive to said local oscillation frequency for converting a transmit intermediate frequency band into said transmit frequency and, said transmit frequency band having a transmit image frequency band which does not overlap said receive frequency band, said transmit intermediate frequency band having its maximum frequency not higher than double the minimum frequency thereof; and receive frequency converter means responsive to said local oscillation frequency for converting the receive frequency band into a receive intermediate frequency band which does not overlap the transmit intermediate frequency band in an area which is higher than the transmit intermediate band.

2. A transmitter/receiver apparatus as claimed in claim 1, further comprising a first frequency multiplexer means which connects one end of a single signal cable to the transmit and receive frequency converter means, a signal of the transmit intermediate frequency band and a signal of the receive intermediate frequency band being propagated over said single cable in a frequency-multiplexed condition.

3. A transmitter/receiver apparatus as claimed in claim 2, further comprising a second frequency multiplexer means which is connected to the other end of the signal cable.

4. A transmitter/receiver apparatus as claimed in claim 2, wherein the signal cable comprises a coaxial cable.

5. A transmitter/receiver apparatus comprising a first and a second device which are interconnected by a single signal cable;

said first device comprising:

local oscillator means for generating a local oscillation frequency at a predetermined position between a transmit and a receive frequency band;

transmit frequency converter means responsive to said local oscillation frequency for converting a transmit intermediate frequency band into said transmit frequency band said transmit frequency band having a transmit image frequency band which does not overlap said receive frequency band, said transmit intermediate frequency band having a maximum frequency which is not higher than double the minimum frequency thereof;

receive frequency converter means responsive to said local oscillator frequency for converting the receive frequency band into a receive intermediate frequency band which does not overlap the transmit intermediate frequency band so that it is not higher than the transmit intermediate frequency band, said receive intermediate frequency band having a receive image frequency band which does not overlap the transmit frequency band; and first frequency multiplexer means connected between one end of the signal cable and said transmit and receive frequency converters means for frequency multiplexing a signal of the transmit intermediate frequency band and a signal of the receive intermediate frequency band, said receive intermediate frequency band having a maximum frequency which is not higher than double the minimum frequency thereof; and said second device comprising:

second frequency multiplexer means connected to the other end of said signal cable; and demodulator means and modulator means connected to respond to said second frequency multiplexer.

6. A transmitter/receiver apparatus as claimed in claim 5, wherein the first device is located outside of a building and the second device is located inside of said building.

7. A transmitter/receiver apparatus as claimed in claim 5, and an antenna having a feeder section, the first device being mounted in said feeder section of an antenna.

8. A transmitter/receiver apparatus as claimed in claim 5, wherein the signal cable comprises a coaxial cable.

9. A system comprising a microwave antenna coupled via a single signal conveying means to means for transmitting and receiving signals in a land based system; common local oscillator means; and means in said antenna responsive to said local oscillator means for frequency converting transmit and receive signals appearing in said antenna through intermediate transmit and receive frequencies and into frequencies transmitted/received over said single signal conveying means; all of the frequency bands of said transmitted/received signals, said intermediate transmit and receive frequencies, and the frequency of said oscillator means occupying completely separate and non-overlapping frequency bands, the intermediate transmit frequency band having a maximum frequency which is not higher than double the minimum frequency thereof, and the intermediate receive frequency band having a maximum frequency which is not higher than double the minimum frequency thereof; and said intermediate receive frequency being not higher than said intermediate transmit frequency.

10. The system of claim 9 and multiplex means forming opposite ends of said single signal conveying means for frequency multiplexing receive/transmit signals in said land based system for transmission over said single signal conveying means.

11. The system of claim 10 and demodulator means and modulator means for feeding said signals between said land based system and said multiplex means forming the land based end of said single signal conveying means.

12. The system of claim 11 wherein equipment on the antenna end of said single signal conveying means is housed in a feeder section of said antenna.

* * * * *